(12) United States Patent
Vanka et al.

(10) Patent No.: US 11,677,899 B2
(45) Date of Patent: Jun. 13, 2023

(54) INTELLIGENT VIDEO SOURCE SELECTION

(71) Applicant: LENOVO (Singapore) PTE. LTD., New Tech Park (SG)

(72) Inventors: Mounika Vanka, Durham, NC (US); John Weldon Nicholson, Cary, NC (US); David Alexander Schwarz, Morrisville, NC (US); Mengnan Wang, Chapel Hill, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 110 days.

(21) Appl. No.: 17/216,253

(22) Filed: Mar. 29, 2021

(65) Prior Publication Data

US 2022/0311952 A1    Sep. 29, 2022

(51) Int. Cl.
| | |
|---|---|
| *H04N 5/268* | (2006.01) |
| *G06F 3/01* | (2006.01) |
| *G06V 10/60* | (2022.01) |
| *G06V 20/40* | (2022.01) |
| *G06V 40/18* | (2022.01) |
| *G06V 40/20* | (2022.01) |

(52) U.S. Cl.
CPC ............ *H04N 5/268* (2013.01); *G06F 3/012* (2013.01); *G06F 3/013* (2013.01); *G06F 3/017* (2013.01); *G06V 10/60* (2022.01); *G06V 20/41* (2022.01); *G06V 40/18* (2022.01); *G06V 40/20* (2022.01)

(58) Field of Classification Search
CPC .......... H04N 5/268; H04N 5/44; G06V 10/60; G06V 20/41; G06V 40/18; G06V 40/20; G06F 3/012; G06F 3/013; G06F 3/017; G06F 3/16

USPC .................................................. 348/705, 706
See application file for complete search history.

(56) References Cited

U.S. PATENT DOCUMENTS

| | | | | |
|---|---|---|---|---|
| 9,554,061 | B1* | 1/2017 | Proctor, Jr. | ............... H04S 7/00 |
| 10,701,284 | B2* | 6/2020 | Marino | ............ H04N 21/44227 |
| 10,855,935 | B2* | 12/2020 | Gopinath | ........... H04N 21/4122 |
| 11,190,606 | B2* | 11/2021 | Einaudi | ............... G06F 16/7837 |

(Continued)

OTHER PUBLICATIONS

Youtube, "Level Up-AI Director", youtube.com, https://www.youtube.com/watch?v=jlyM_qT9RZw&t=190s, Aug. 19, 2020, pp. 1-2.

*Primary Examiner* — Trang U Tran
(74) *Attorney, Agent, or Firm* — Kunzler Bean & Adamson

(57) ABSTRACT

An apparatus for intelligent video source selection includes a processor and a memory storing machine-executable code to establish data connectivity with a plurality of video sources based on the sources being within a predetermined proximity of the apparatus. The code is executable by the processor to determine a set of video parameters for the individual video sources of the plurality, the video parameters including user gaze, gesture detection, activity level, and combinations thereof. The processor operates to select a first video source of the plurality of video sources as an active video source based on one or more application context parameters and to switch the active video source from the first video source to a second video source based on the set of video parameters of the second video source meeting predetermined switching criteria. Systems, computer program products, and methods may perform the functions of the apparatus.

20 Claims, 7 Drawing Sheets

(56) References Cited

U.S. PATENT DOCUMENTS

| | | | |
|---|---|---|---|
| 2008/0141317 A1* | 6/2008 | Radloff | H04N 21/631 |
| | | | 725/87 |
| 2017/0047048 A1* | 2/2017 | Rumreich | G09G 5/10 |
| 2021/0333884 A1* | 10/2021 | Li | G06F 3/013 |

* cited by examiner

Video Parameters 300

| Video Source Proximity 304 | A |
|---|---|
| Wired Connection 306 | B |
| Stable Wireless Range 308 | C |
| Frame Filling Range 310 | D |
| Focusing Range 312 | E |
| Lighting Range 314 | F |
| Audio Range 316 | G |
| User-defined Proximity 318 | H |

| Video source types 322 | I |
|---|---|
| Integrated Webcam 324 | J |
| External Webcam 326 | K |
| Document Camera 328 | L |
| Digital SLR 330 | M |
| Smartphone Camera 332 | N |
| IP Camera 334 | O |
| Window/Screen Share 336 | P |
| User-defined Video Source 338 | Q |

| Activity Context 342 | R |
|---|---|
| Application Context 344 | S |
| Application Type 346 | T |
| Default Video Source 348 | U |
| Video Event Type 350 | V |
| Video Attendees 352 | W |
| User-defined Appl. Context 354 | X |

| User Context 360 | Y |
|---|---|
| User Video Source Pref. 362 | Z |
| User Video Source History 364 | AA |

| Video Source Activity 370 | AB |
|---|---|
| Activity Level 372 | AC |
| Eye Gaze 374 | AD |
| Capture Source Live Status 376 | AE |
| Gesture Timing 378 | AF |
| Gesture Type 380 | AG |
| Head Nod 382 | AH |
| Head Lean 384 | AI |
| Finger Count 386 | AJ |
| Direction Pointing 388 | AK |
| Virtual Touch 390 | AL |
| Virtual Swipe 392 | AM |
| User-defined Gesture 394 | AN |

Active Video Source Criteria 302 = f(expr(A, B, C,...AN))

FIG. 3

INTELLIGENT VIDEO SOURCE SELECTION

FIELD

The subject matter disclosed herein relates to video source selection and more particularly relates to intelligent video source selection.

BACKGROUND

Some information handling devices such as a desktop computer, laptop, or a smartphone can capture and send video from a variety of video sources. However, many applications require a user to manually select a desired camera or other type of video source before starting the video stream. Existing solutions lack the ability to intelligently select active video sources based on context.

BRIEF SUMMARY

Apparatuses, methods, systems, and program products are disclosed for intelligent video source selection. An apparatus for intelligent video source selection includes a processor and a memory that stores code executable by the processor to: establish data connectivity with a plurality of video sources based on the connecting video sources meeting one or more predetermined proximity criteria; determine values for a set of video parameters corresponding respectively to individual video sources of the plurality of video sources for comparison with a predetermined set of active video source criteria for a current activity context; and select an active video source of the plurality of video sources in response to determining that the set of video parameters for the selected source meets the predetermined set of active video source criteria for the current activity context.

A method for intelligent video source selection is disclosed. The method in various examples includes: establishing data connectivity with a plurality of video sources based on the connecting video sources meeting one or more predetermined proximity criteria; determining a set of video parameters corresponding respectively to individual video sources of the plurality of video sources for a current activity context; and selecting an active video source of the plurality of video sources in response to determining that the set of video parameters for the selected source meets a predetermined set of active video source criteria for the current activity context.

A computer program product for intelligent video source selection is disclosed. The computer program product, in some examples, includes a machine-readable storage medium having program instructions embodied therewith, where the program instructions are executable by a processor to cause the processor to: establish data connectivity with a plurality of video sources based on the connecting video sources meeting one or more predetermined proximity criteria; compare values for a set of video parameters corresponding respectively to individual video sources of the plurality of video sources with a predetermined set of active video source criteria for a current activity context; and select an active video source of the plurality of video sources in response to determining that the set of video parameters for the selected source meets the predetermined set of active video source criteria for the current activity context.

BRIEF DESCRIPTION OF THE DRAWINGS

A more particular description of the examples briefly described above will be rendered by reference to specific examples that are illustrated in the appended drawings. Understanding that these drawings depict only some examples and are not, therefore, to be considered to be limiting of scope, the examples will be described and explained with additional specificity and detail through the use of the accompanying drawings, in which:

FIG. 3 depicts video parameters for intelligent video source selection, according to one or more examples of the present disclosure;

DETAILED DESCRIPTION

Figure 1:
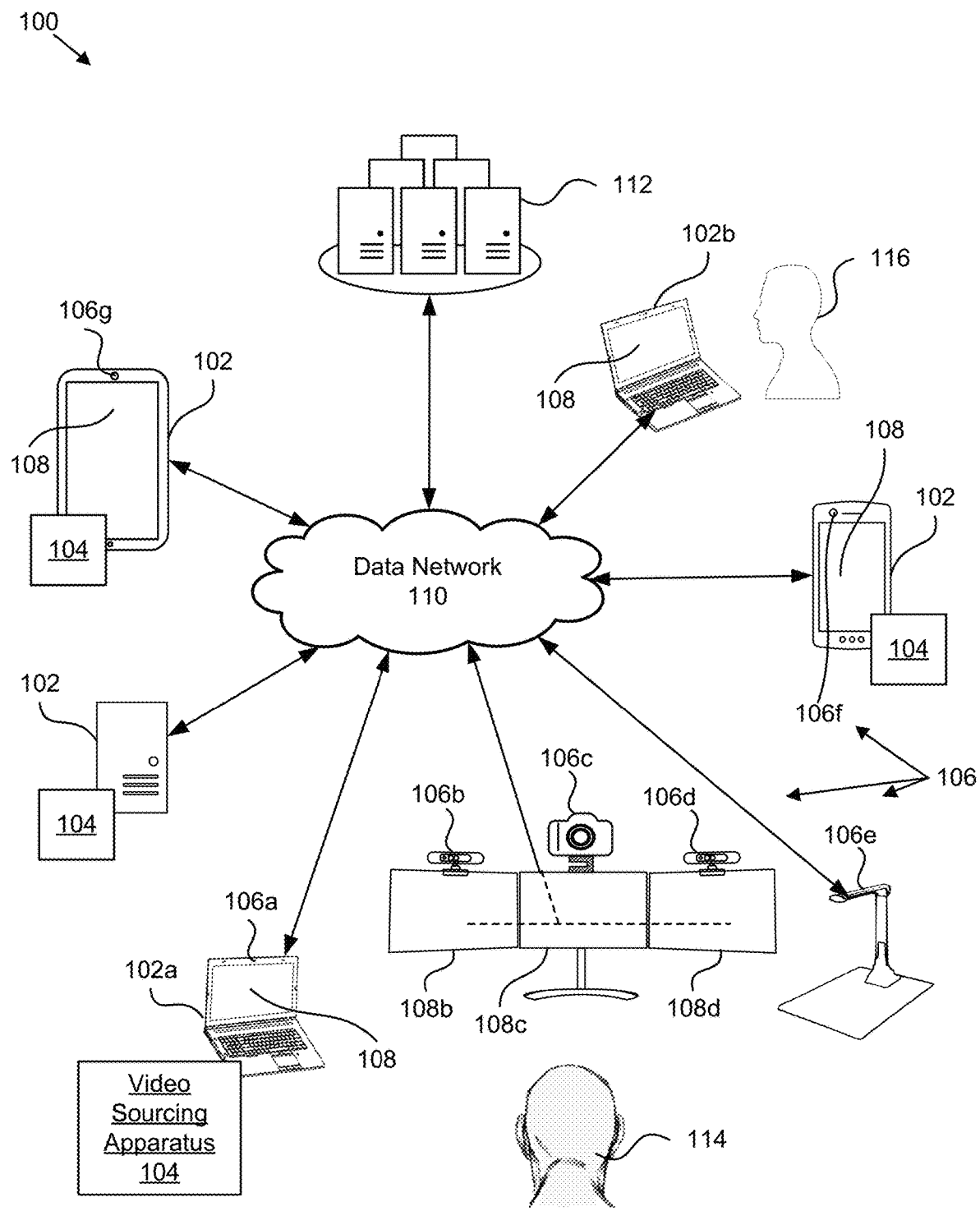
FIG. 1 is a schematic block diagram illustrating a system for intelligent video source selection, according to one or more examples of the present disclosure.

As will be appreciated by one skilled in the art, aspects of the disclosure may be implemented as a system, a method, and/or a program product. Accordingly, examples may take the form of an entirely hardware implementation, an entirely software implementation (including firmware, resident software, micro-code, etc.) or an implementation combining software and hardware aspects that may all generally be referred to herein as a "circuit," "module" or "system." Furthermore, examples may take the form of a program product implemented in one or more computer readable storage devices storing machine-readable code, computer readable code, and/or program code, referred hereafter as code. The storage devices may be tangible, non-transitory, and/or non-transmission. In certain examples, the storage devices only employ signals for accessing code.

Various of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices or the like.

Modules may also be implemented in code and/or software for execution by various types of processors. For example, an identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module or controller.

Indeed, a module of code or may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device.

Code for carrying out operations for examples may be written in any combination of one or more programming languages including an object-oriented programming language such as Python, Ruby, R, Java, JavaScript, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). It may be noted that as used herein, the term "computer" may refer to any type or form of information handling device unless otherwise clear from context.

In various examples, code may execute at least partially on an artificial intelligence (AI) accelerator. For example, a tensor processing unit (TPU) is one example of an AI accelerator available from Google, Inc. of Mountain View, Calif., and implemented as an application specific integrated circuit (ASIC) specifically for neural network machine learning using TensorFlow® software, which is also available from Google, Inc. Other deep learning, machine learning, accelerators and corresponding software are available from other suppliers such as Nvidia Corporation of Santa Clara, Calif., Reference throughout this specification to "one example," "an implementation," or similar language means that a particular feature, structure, or characteristic described in connection with the example is included in at least one implementation. Thus, appearances of the phrases "in one example," "in an example," and similar language throughout this specification may, but do not necessarily, all refer to the same example or implementation. Similarly, select aspects of the disclosure which are "according to one or more examples of the present disclosure" means that the selected aspects may be present in at least one example, may be present in more than one example, and may be present in all example.

The terms "including," "comprising," "having," and variations thereof mean "including but not limited to," unless expressly specified otherwise. An enumerated listing of items does not imply that any or all of the items are mutually exclusive unless expressly specified otherwise. The terms "a," "an," and "the" also refer to "one or more" unless expressly specified otherwise. The term "and/or" indicates examples of one or more of the listed elements, with "A and/or B" indicating examples of element A alone, element B alone, or elements A and B taken together. Likewise, as used herein, the phrase "at least one of" indicates examples of one or more of the listed elements, with "at least one of A and B" indicating examples of element A alone, element B alone, or elements A and B taken together. In other words, with respect to listed elements, the terms "and/or", and "at least one of" indicate examples of any of the listed elements alone as well as examples with any combination of the listed elements.

Furthermore, the described features, structures, or characteristics of the examples may be combined in any suitable manner. In the following description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described below with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other information handling device to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, an information processing device, or other device to function in a particular manner, such that the instructions stored in the storage device produce an article of manufacture including instructions which implement the function/act specified in the schematic flowchart diagrams and/or schematic block diagrams block or blocks.

The code may also be loaded on to a computer, an information processing device, or other device, to cause a series of operational steps to be performed on the computer, or information handling device to produce a computer implemented process such that the code which executes on the computer, the information processing device, or the other device, provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various examples. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding examples. Indeed, some arrows or other connectors may be used to indicate only the logical flow of the depicted example. For instance, an arrow may indicate a waiting or monitoring period of unspecified duration between enumerated steps of the depicted example. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate examples of like elements. Reference numbers in the figures may include a base number and/or a base number followed by a lowercase letter to refer to different individual elements. A reference to a base number may refer to various elements of the group of elements having the base number including those elements referenced by a base number followed by a lowercase letter, unless otherwise clear from the context.

By way of introduction, as work-from-home situations, remote education, and similar video intensive modes of communication become more prevalent in certain sectors, some users may set up a full-fledged home office with video sources such as a document camera or document scanner, an external web camera, a digital single lens reflex camera, and so forth, along with their primary device such as a laptop, a desktop, a tablet, or another type of information handling device. Various users may select different cameras with varying quality based on the type of usage such as holding a video meeting in which the video quality may be a secondary factor to recording a video for their social media feed in which having high quality video may be a significant factor.

Moreover, with existing systems, connecting these various video sources, and selecting a default and/or active video source is a manual process. Setting up or changing the primary input feed (e.g., default/active video source) requires extra effort and is usually cumbersome. Furthermore, once various video devices have been setup, a user has to manually choose the desired camera/video device before starting the video stream on video calling or conferencing applications such as Skype, Microsoft Teams®, Zoom®, and the like, or while scanning documents on scanning applications.

Although some operating systems include gaze input APIs or gaze interaction libraries, existing gaze tracking tools have limited support for multiple cameras and such cameras must be wired or wirelessly connected to the same computer or device and the ability to select different video sources does not extend to video sources associated with separate devices such as phone cameras, scanner cameras, and so forth.

The systems, apparatuses, and methods of the present disclosure address these and similar issues by providing an intelligent platform for detecting the video sources in proximity and automatically forming these connections thereby improving the performance of video-based systems. The platform also selects the default and/or active video source based on one or more video parameters such as the application context of the application trying to access a video source and also based on a user context which may include video parameters such as gestures on a live video source or on a standby video source.

The gestures may include head or facial gestures such as user gaze, head nods, head leans, and so forth. The gestures may include hand or finger gestures such as finger counts, virtual touches, direction pointing. Other video parameters may include user video source preferences, application context, etc. As one improvement over existing multicamera systems, in which the default video source (e.g., camera) may be typically selected by choosing the device by name and the apparatuses, the systems, apparatuses and methods disclosed herein are able to make the default/updated video source selection process more intelligent and user friendly by detecting user eye gaze, fingertip pointing, head nods, activity level within field of imaging, and other video parameters. This intelligent video source selection may be performed even when certain cameras and other video sources such as cell phone cameras, document cameras, and in particular camera that are not user—facing present challenges for automatically selecting an active video source based on existing eye gaze functions.

The advantages of the systems, apparatuses, and methods disclosed herein, are particularly notable for those users likely to use multiple video sources who often record or broadcast video very frequently (e.g., on a daily basis) thus reducing tedious manual video source selection and at the same time facilitating improved video production quality.

FIG. 1 is a schematic block diagram illustrating a system 100 for intelligent video source selection, according to one or more examples of the present disclosure. In various examples, the system 100 includes one or more information handling devices 102, one or more video sourcing apparatuses 104, one or more video sources 106, one or more displays 108, one or more data networks 110, and one or more servers 112. The system 100 and various components of the system 100 may be used by one or more local users 114 and certain components of the system may be used by one or more remote users 116.

In certain example, even though a specific number of information handling devices 102, video sourcing apparatuses 104, video sources 106, displays 108, data networks 110, and servers 112, are depicted as illustrated in FIG. 1, one of skill in the art may recognize, in light of this disclosure, that any number of information handling devices 102, video sourcing apparatuses 104, video sources 106, displays 108, data networks 110, and servers 112, may be included in the system 100.

In certain examples, the system 100 includes one or more information handling devices 102, such as for example laptops, tablets, smartphones, desktops, workstations, and so forth. In some examples the information handling device 102 includes a processor (e.g., a central processing unit ("CPU"), a processor core, a field-programmable gate array ("FPGA") or other programmable logic, an application-specific integrated circuit ("ASIC"), a controller, a microcontroller, and/or another semiconductor integrated circuit device), a volatile memory, and/or a non-volatile storage medium, and/or the like.

In various examples, at least one of the information handling devices 102 such as information handling device 102a is configured to interact with a local user 114 to facilitate capturing and exchanging video data (e.g., in a video conference) with another Information handling device 102b utilized by remote user 116.

In certain examples, the information handling device 102 is included in or coupled to a housing of a video source 106. In other examples, one or more information handling devices 102 are separate devices from the video source 106.

In various examples, an information handling device 102 includes one or more displays 108. In certain examples, the information handling device 102 includes one or more user interfaces, such as for example, a touchscreen display, a physical keyboard, a mouse, a voice control, or similar user interface devices or accessories. The information handling devices 102 include one or more network interfaces such as for example a wireless connection between the information handling device 102 and the video source 106. In such examples, the information handling device 102 may communicate with the video source 106 over a data network 110.

In a depicted example, the system 100 includes a video sourcing apparatus 104 for intelligent video source selection. In some examples, the video sourcing apparatus 104 is implemented in the information handling device 102 either as a software program that runs on a processor of the information handling device 102 and/or on a specialized processor such as a tensor processing unit or other machine learning/artificial intelligence accelerator processor that is configured to execute artificial intelligence and machine learning code to recognize poses, gestures, and other relevant video parameters from video data captured by image sources. In certain examples, the video sourcing apparatus may be implemented as a hardware/firmware implementation, or another combination of hardware and software.

In some examples, the video sourcing apparatus 104 determines whether a predetermined condition is satisfied for communicating audiovisual content in a selected viewing context. In various examples, the video sourcing apparatus 104 establishes data connectivity with certain video sources 106. In certain examples, the system 100 includes a video sourcing apparatus 104 that is configured to establish connectivity with a plurality of video sources 106 based on the connecting video sources 106 meeting one or more predetermined proximity criteria. The video sourcing apparatus 104 is also configured to compare a set of video parameters comprising at least user eye gaze for the individual video sources of the plurality of video sources 106 with a predetermined set of active video source criteria. The video sourcing apparatus 104 is further configured to select an active video source 106a, 106b of the plurality of video sources 106 in response to determining that the set of video parameters for the selected source meets a predetermined set of active video source criteria. The video sourcing apparatus 104 is described in more detail below with respect to FIG. 2. Various examples of video parameters that may be determined by the video sourcing apparatus are described in more detail with respect to FIG. 3.

In various examples, the system 100 includes one or more displays 108 that display various types of data including video content. In certain examples, the video source 106 is included in or coupled to the housing of the display 108. In some examples, the display 108 is separate from and in data communication with the information handling device 102 and/or the video sourcing apparatus 104. Certain examples of the display 108 are described in more detail with respect to FIG. 2.

In certain examples, the system 100 includes a data network 110 and the information handling devices 102 are communicatively coupled to one or more other information handling devices 102 and/or to one or more servers 112 over the data network 110, described below. The information handling devices 102, in a further example, may include processors, processor cores, specialized processors such as AI accelerators, GPUs, and so forth that execute various programs, program code, applications, instructions, functions, and/or the like. In some examples, the information handling devices 102 use the data network 110 to download application-specific software such as video capture software, video device adjusting software, drivers, and other software that may benefit from or assist with intelligent video source selection.

The data network 110, in one example, includes a digital communication network that transmits digital communications. The data network 110 may include a wireless network, such as a wireless cellular network, a local wireless network, such as a Wi-Fi network, an ad hoc network, and/or the like. The data network 110 may include a wide area network ("WAN"), a local area network ("LAN"), an optical fiber network, the internet, or other digital communications network. The data network 110 may include two or more networks. The data network 110 may include one or more servers, routers, switches, and/or other networking equipment. The data network 110 may also include one or more computer readable storage media, such as a hard disk drive, an optical drive, non-volatile memory, RAM, or the like.

The wireless connection may be a mobile telephone network. The wireless connection may also employ a Wi-Fi network, including for example, Wi-Fi networks similar to any one of the Institute of Electrical and Electronics Engineers ("IEEE") 802.11 standards. All standards and/or connection types include the latest version and revision of the standard and/or connection type as of the filing date of this application.

The one or more servers 112, in one example, may be embodied as blade servers, mainframe servers, tower servers, rack servers, and/or the like. The one or more servers 112 may be configured as mail servers, web servers, application servers, FTP servers, media servers, data servers, web servers, file servers, virtual servers, and/or the like. The one or more servers 112 may be communicatively coupled (e.g., networked) over a data network 110 to one or more information handling devices 102. The servers 112 may comprise back-end servers for video processing, cognitive services, video integration, and/or the like.

Figure 2:
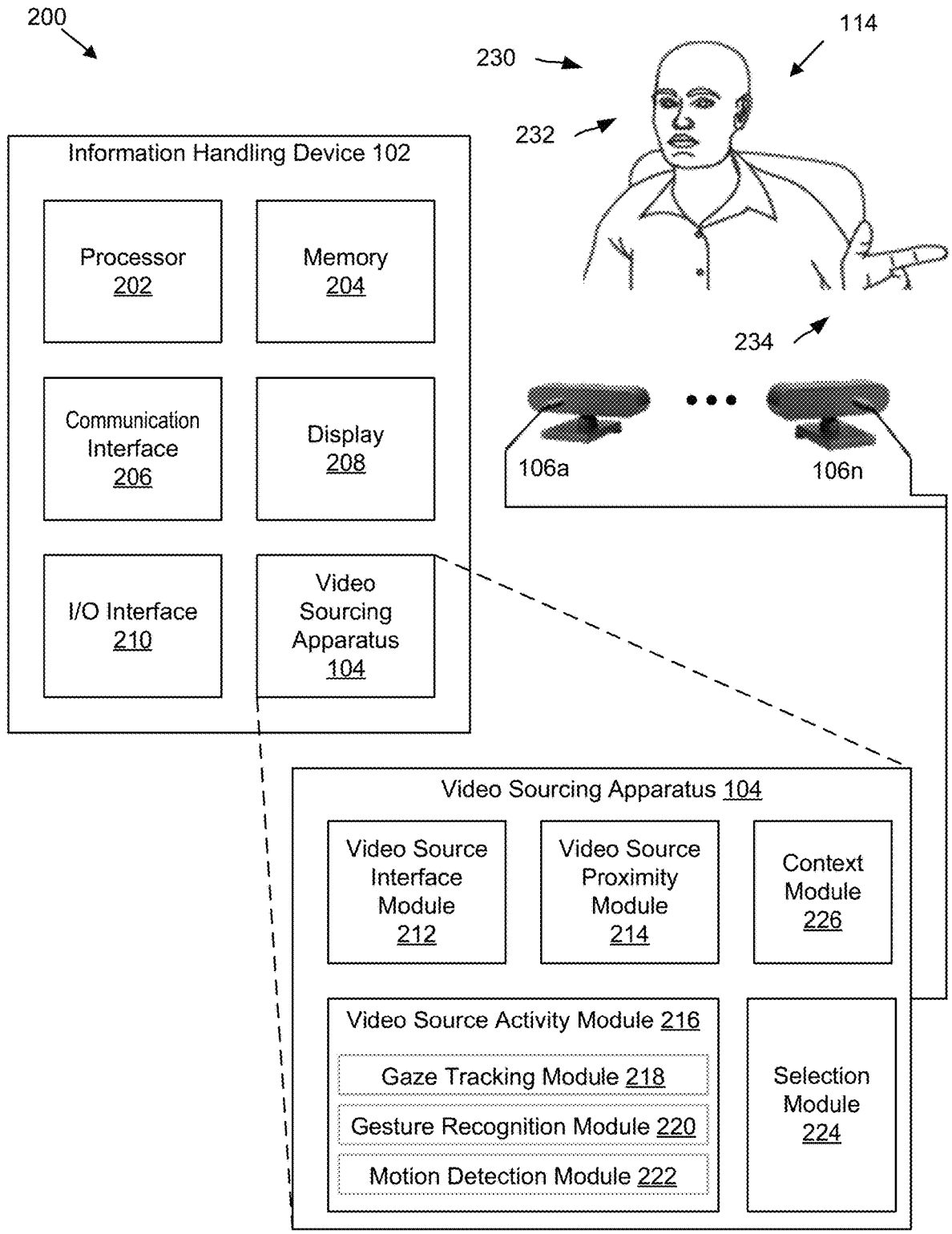
FIG. 2 is a schematic block diagram depicting an apparatus for intelligent video source selection, according to one or more examples of the present disclosure.

FIG. 2 is a schematic block diagram depicting an apparatus 200 for intelligent video source selection, according to one or more examples of the present disclosure. FIG. 3 depicts video parameters 300 for intelligent video source selection, according to one or more examples of the present disclosure. In various examples, the video sourcing apparatus 104 determines values for a set of video parameters 300 corresponding respectively to individual video sources from among multiple video sources for comparison with a predetermined set of active video source criteria for a current activity context.

For various of the video parameters, the apparatus 200 may access and/or update active video source criteria that may include values, ranges, maximums, minimums, thresholds, matching values, categories, types, or expressions or combinations of the same, which are determined by an equipment manufacturer, software manufacturer, a user, or by machine learning based on optimization algorithms that may include usage information, quality information, and so forth. It may be noted that as used herein, the term "range" is used to refer to one or more values, ranges, maximums, minimums, thresholds, matching values, categories, types, or expressions or combinations of the same, or similar quantitative indicators.

In various examples, the apparatus 200 includes one or more instances of a local information handling device 102, such as for example, the local information handling device 102a which is depicted as a laptop, although type of information devices 102 may be used to implement a portion or all of the video sourcing apparatus 104.

In one or more examples, the apparatus 200 includes a processor 202, a memory 204 that is accessible by the processor 202, a communication interface 206, a display 208, an I/O interface 210, and a video sourcing apparatus 104. It may be noted by a person of ordinary skill in the art that the information handling devices 102 may include other components for performing various functions consistent with the type of information handling device 102 being used (e.g., laptop, desktop, smart phone, tablet, and so forth).

In some examples, the apparatus 200 includes or is configured to connect to one or more video sources 106. In certain embodiments, the one or more video sources 106 are external accessories to the information handling device 102. In various implementations, the one or more video sources 106 are integrated in the same housing as the information handling device 102. For example, an information handling device that is a smart phone, a tablet, or a convertible or hybrid laptop, may include one or more first video sources 106 that are front-facing cameras and one or more second video sources 106 that are back-facing cameras. As illustrated in FIG. 3, various of the one or more video sources 106 may have the same or different video source types 322. Additional details about the various video source types 322 are described in more detail below with respect to FIG. 3.

In certain examples, the one or more video sources 106 may include various types of digital cameras for capturing images of a face 230, eye(s) 232, hands 234, or other aspects of a user 114 or a user's environment. In some embodiments, the images are processed by the processor 202 or by another processor additional to the processor 202 for determining facial, manual, or other gestures associated with the user 114. The processor 202 may include multiple general-purpose processors and/or multiple processor cores.

In various examples, the apparatus 200 may include or may communicate with specialized processors such as graphics processing units (GPUs), artificial intelligence (AI) accelerators and/or machine learning (ML) accelerators such as for example tensor processing units, neural processing units, and so forth that execute various artificial intelligence/machine learning programs, applications, instructions, functions, and/or the like.

In certain examples, the machine learning accelerators may be optimized for energy efficiency, privacy, data storage minimization, latency minimization and so forth. In some examples, the machine learning accelerators may be locally coupled to the information handling device 102 such as for example through a USB interface. In certain examples, one or more machine learning accelerators and/or processing functions may be integrated into the video sources 106 thereby minimizing the amount of processing and/or communication video sources 106 and the information handling device 102.

In some examples, the apparatus 200 utilizes the memory 204 to access program code and/or data. The memory 204 may include volatile and/or nonvolatile memory and may include memory that may be coupled or decoupled to the information handling device such as a microSD card solid-state drive, or similar storage device. In various examples, the information handling device 102 accesses memory 204 that is virtual memory stored in a storage area network, a remote server, cloud-based data storage, or other discrete or distributed network storage devices such as for example storage devices accessible by the one or more servers 112 depicted in FIG. 1.

In various examples, the memory 204 stores code executable by the processor 202 to establish data connectivity with a plurality of video sources 106 based on the connecting video sources 106 meeting one or more predetermined proximity criteria. The code may also be executable by the processor to determine values for a set of video parameters corresponding respectively to individual video sources of the plurality of video sources for comparison with a predetermined set of active video source criteria for a current activity context and to select an active video source 106 of the plurality of video sources in response to determining that the set of video parameters for the selected source meets the predetermined set of active video source criteria for the current activity context.

In various examples, the apparatus 200 includes a communication interface 206. The communication interface 206 may include hardware circuits and/or software (e.g., drivers, modem, protocol/network stacks) to support wired or wireless communication between the electronic device 102 and another device or network, such as the network 110. The wireless connection may include a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

In some examples, the apparatus 200 includes an I/O interface 210 that is configured communicate with accessories, peripheral devices, input devices, output devices, and so forth. In certain examples, the I/O interface 210 may support various industry standards, such as for example, universal serial bus (USB), USB 2.0, USB 3.0, USB3Vision®, USB 3.1, USB 3.2, FireWire®, HMDI, CameraLink, GigE, and so forth which may be used to communicate with one or more video sources 106 and/or with other devices, peripherals, accessories, and so forth. The foregoing lists of interfaces with a wired or wireless is not intended to be an exhaustive list of the interfaces that may be used in implementing the apparatus 200 and is intended to show that certain interfaces can be used advantageously to implement the system 100 and/or the apparatus 200.

In certain examples, the apparatus 200 includes an audio output such as for example a loudspeaker, an interface to Bluetooth® or similar wireless speaker, etc. In certain examples, the audio output projects an audio portion of the video content. In various examples, the apparatus 200 includes an audio input, such as for example a microphone that receives audio input, such as for example, voice commands from the user 114. In some cases, the audio input is implemented as part of the more or more video sources 106a-106n.

In one or more examples, the apparatus 200 includes a video sourcing apparatus 104 that includes a video source interface module 212, a video source proximity module 214, a video source activity module 216, and a switching module 224.

In some examples, the video source interface module 212 is configured to establish data connectivity between the video sourcing apparatus 104 and the one or more video sources 106 (e.g., 106a . . . 106n). In certain examples, the video source interface module 212 utilizes various features of the communication interface 206 and/or the I/O interface 210, to establish data connectivity between the video sourcing apparatus 104 and the one or more video sources 106 (e.g., 106a . . . 106n). In some examples, the video source interface module 212 uses data communications with one or more video sources 106 based on the connecting video sources 106 meeting one or more predetermined proximity criteria.

In one or more examples, the video sourcing apparatus 104 includes a video source proximity module 214 that is configured to determine whether or not an individual video source 106n of the needs one or more predetermined proximity criteria and then uses that determination as a basis for establishing data connectivity with the individual video source 106 meeting the one or more predetermined crop proximity criteria.

Referring also to FIG. 3, various examples of predetermined proximity criteria, such as video source proximity 304 are included among various video parameters 300. An individual video source 106n may also be referred to as a candidate video source 106 because the video sourcing apparatus 104 may or may not establish data connectivity with the individual video sources 106n based on whether or not the particular individual video source 106 and meets the predetermined proximity criteria (e.g., video source proximity 304).

In certain examples, the video source proximity module 214 may determine that the predetermined proximity criteria, such as video source proximity 304 is met, at least in part, by detecting one or more video sources such as video sources 106 that are electrically connected via a wired connection to an information handling device (such as information handling device 102) using any of various wired interfaces, such as for example, Universal Serial Bus (USB) 2.0, USB 3.0, USB3Vision®, USB 3.1, USB 3.2, FireWire®, HMDI, CameraLink, GigE, and so forth.

In certain examples, the video source proximity module 214 may utilize data from an application programming interface (API) such as Companion Device, Nearby Connections, or similar packages pairing or enabling data communication between an information handling device and a video source that includes a wireless interface such as Bluetooth, Bluetooth Low Energy (BLE), or Wi-Fi Internet protocol.

However, in some examples, determining that the predetermined proximity criteria, such as video source proximity 304 is met by a video source 106 that is electrically connected to the information handling device 102 may also include determining that video images conveyed by the candidate video source 106 meet predetermined criteria relating to video framing and composition parameters.

In certain examples, the video source proximity module 214 may initially determine that a particular web camera acting as a candidate active video source meets a wired connection 306 portion of active video source criteria 302 criteria but that based on received image data from the candidate video source, the video source proximity module may make a secondary determination that the candidate video source does not meet certain video framing and composition parameters such as a frame filling range 310, a focusing range 312, a lighting range 314, an audio range 316, a user-define proximity range 318, and so forth, because given the limitations of the candidate video source's camera capabilities (e.g., zoom, focal length, pan, tilt, etc.) and the distance and angle from the candidate video source to the intended subject or object of the video frame, the candidate video source would be determined to be videographically out of an acceptable proximity range.

In addition to the video framing and compositions parameters acting as proximity criteria, e.g., for determining whether a candidate video source 106n is "in proximity" to be establish connectivity as a video source that may be selected as the default or active video source, various of the video source proximity parameters may also be categorized as quality parameters that can be utilized as elements in one or more expressions that are used by the video source apparatus 104 as part of a predetermined set of active video source criteria 302 for comparison with a set of video parameters.

It may be noted that in certain examples comparison of a "set" of video parameters with a "set" of predetermined active video source criteria 302 for a particular activity context may be a comparison of a single video parameter with a single active video source criterion (e.g., value, range, expression, etc.) and in other examples for another activity context, comparison of the "set" of video parameters with the "set" of predetermined active video source criteria may involve various combinations of multiple video parameters with multiple active video source criterion (e.g., values, ranges, expressions, etc.).

For many video applications, such as for example, video recording, video blogging (vlogging), web conferencing, etc., audio quality is an important aspect. Accordingly, in certain examples, the predetermined proximity criteria, such as video source proximity 304 may include the candidate being within an audio range 316, within which range, a sound such as a video subject's voice, which is captured by the video source falls within a predetermined detected input volume range.

In some examples, meeting the active video source criteria further includes detecting that second lighting conditions detected by the second video source that are within a predetermined range of first lighting conditions of the first video source. For example, if lighting conditions for a second video source that is capturing video but is not selected as the active video output source are similar to lighting conditions for a first video source that is currently the active video source, the video source proximity module 214 may determine based on the lighting conditions being within a similar range that the second video source is suitably within proximity whereas if the lighting conditions for the second video source are much different (e.g., the lighting in the location of the second video source is turned off) the video source proximity module 214 may determine that although the second video source may be a wired connection 306 or within stable wireless range 308, the second video source is not suitably within proximity.

Like the video parameters 300, in various examples, the value, ranges, expressions, and combinations of predetermined proximity criteria, such as video source proximity 304 may be established and/or updated by an equipment vendor, installation parameters for particular application software, operating system settings, user settings, administrative settings, and so forth.

In various examples, the video sourcing apparatus 104 includes a video source activity module 216. In certain examples, the processor 202 is configured to determine the set of video parameters 300 for the individual video sources 306 within the current activity context 342, the set of video parameters 300 including: eye gaze 342, such as an eye gaze direction and duration towards the individual video sources 106 that are operable to capture facial images, e.g., that are user-facing. The processor 202 may be configures to determine a detected activity level within a video capture field of view of the individual video sources 106 and to further determine one or more detected gestures within a field of view of the individual video sources. The processor 202 may also be configured to determine one or more user video source preferences for the current activity context; and/or to determine one or more video source preferences inferred by machine learning analysis of user video source history 364 for the current activity context 342.

In some examples, meeting the active video source criteria may include detecting within a predetermined period: a first type of video parameter including an eye gaze shift away from first video source towards a second video source; and a second type of video parameter comprising a detected gesture mapped to an instruction to select the second video source as the active video source.

In various examples, meeting the active video source criteria includes detecting within a predetermined period: a first type of video parameter comprising an eye gaze shift away from first video source towards a second video source; and a second type of video parameter including a detected gesture mapped to an instruction to select the second video source as the active video source. Having the detection occur within a predetermined period may be helpful to ensure that the eye gaze shift and the gesture are intended to be considered in combination.

However, the predetermined period can be very short if desired so as to facilitate rapid and smooth switching between selected active video sources without unnecessary delays associated with some existing applications that utilize gaze tracking.

In certain examples, meeting the active video source criteria further includes detecting that second lighting conditions detected by the second video source that are within a predetermined range of first lighting conditions of the first video source.

In some examples, video source activity module 216 determines an activity context 342 based on an application context 344, a user context 360, video source activity 370, and combinations thereof. In certain examples, the video source activity module 216 includes additional modules or submodules such as a gaze tracking module 218, a gesture recognition module 220, and/or a motion detection module 222. In various examples, the video sourcing apparatus 104 include a context module 226 that is configures to determine an active context based on application context 344 and/or user context 360.

It may be noted that the video sourcing apparatus 104 and the video source interface module 212, the video source proximity module 214, the video source activity module 216, the source selection module 224, and the context module 226, may be configured in accordance with various video source types 322, such as illustrated in FIG. 3. Some examples of video source types 322 include an integrated camera 324 an external webcam 326, a document camera 328, a digital SLR 330, a smart phone camera 332, an IP camera 334, a window/screen share 336, and/or a user-defined video source 338, and/or application context 344.

In various examples, the list of video source types 322, e.g., cameras and/or devices available for the live switching may be chosen based on context determined from images captured previously or in real-time such as imaging having a similar subject in view or having the same lighting conditions or a combination of the two. The context may also take application context 344 into account. For example, while sharing a document, the focus e.g., the active video source, may be configures to switch from the user's webcam/integrated camera to the phone camera/document camera scanner/based on a shift in the gaze and also change in the activity level. As another example, during a video conferencing call, only the cameras that have the subject in view, and have similar lighting conditions are available for live switching of focus during the call.

In certain examples, the video source activity module 216 determines the activity context at least in part based on an application context 344. The application context 344 may include video parameters 300 such an application type 346, a default video source 348, a video event type 350, video attendees 352, and/or a user-defined application context 354.

As to application type 346, various modules, or components of the video sourcing apparatus 104 may be implemented as part of an operating system, or an application such as a web browser, an application such as Slack®, which acts as a platform or host for other applications. The application context 344 with different application types 346 which do not have their own level of default video source selection features may be similar.

In some examples, various modules or components of the video sourcing apparatus 104 may be implemented as part of a virtual camera driver. One example of a virtual camera driver may be found in OBS— Open Broadcasting Software obtainable at https://obsproject.com with representatives at Wizards of OBS, LLC of Temecula, Calif.

In various examples, automatic and/or default video source/device selection can be done on a per-application basis. For example, video conferencing applications such as Microsoft Teams®, Zoom®, or WebEx® may be configured to open a smartphone camera, if it is available, e.g., in proximity. As another example, applications such as a scanner app and/or an expense reporting app may be configured to select an active or default video source that is a document camera.

In some examples, certain online/network applications including, for example, video calling or conferencing applications such as Skype, Microsoft Teams®, Zoom® may include a second level of video source selection based on application specific factors. For example, certain video conferencing applications have "speaker view" feature or "active speaker" video layout which shows it the person currently speaking in the main (large) window while the rest of the participants are listed or shown less prominently. In certain examples, the application context 344 may include default video parameters 300 that enable intelligent video source selection to be performed based on video event type 350 or on a list of video attendees 352.

For example, if the activity context video event type is a professional type of video session, such as, for example, a webinar, and the user is presenting video at the webinar as a presenter, the video sourcing apparatus may select a video source such as a DSLR or a professional video camera, whereas an integrated camera or a smart phone user-facing camera may be selected as the default/active video source where the user is a more passive participant in a video conference.

At the application level for online video applications, the expected and/or built-in video selection functions may continue to operate normally, e.g., displaying the video feed of the person currently speaking as the active speaker. However, to use a dedicated document camera or a smart phone held by a document camera stand, tripod, or gooseneck holder, in the same call or video conference, existing applications generally require the user to manually select the document camera as the video source or to run an application that captures shared video from the smart phone and in some examples that smart phone video source will be treated by the network application as if it were a screen share.

Furthermore, some existing video conferencing applications allow a user to add a device such as a smart phone to an ongoing video conference hosted by the user but again the selecting and/or deselecting video output of the smart phone as an active video source is a manual process that can be cumbersome.

However, using the system 100, apparatus 200, and methods 500, 600 (described below) disclosed herein, a local level of local intelligent video source selection is provided so that video stream being output to the network video application is selected automatically and intelligently by based on the video source proximity, video source activity level, and on other video parameters 300, such as for example, eye gaze 374.

In various examples, the video source activity module 216 includes a gaze tracking module 218. The gaze tracking module 218 may implement one or any combination of gaze tracking algorithms to perform gaze tracking such as for example face detection, eye region localization, iris direction estimation, corneal reflection, neural networks, and so forth. In certain examples, the gaze tracking module 218 is configured to determine an eye gaze direction and eye gaze duration towards the individual video sources 106 that are operable to capture facial images (e.g., user-facing video sources 106).

As an example of a user-facing video source, a video source 106b may be digital camera mounted at a top portion of a display and configured to have a field of view directed outwardly from a front plane of the display. As an example of a video source that is not user-facing, a selected video source 106e may be a digital camera such as a document camera or a smart phone camera on a stand that is adjustably mounted above a horizontal surface and configured to capture video data of a user manually interacting with a drawing surface, e.g., to capture a drawing motion being performed on a drawing surface. In certain embodiments, a gesture may include a virtual drawing movement i.e., performed in the air to indicate an intended selection of a video source 106 such as a document camera or a smart phone on a stand serving as a document camera.

Other examples of user-facing video sources may include a video source 106c, which is depicted as a digital single lens reflex camera, a video source 106d, which is included as a second monitor-mounted video source 106, a video source 106f, which is depicted as a smart phone front-facing camera (which is sometimes also referred to as a selfie camera), a video source 106g, which is depicted as a front facing tablet camera. Other video sources might include digital microscopes, digital telescopes, or any other type of video source which a user may use in a video presentation such as a demonstration, classroom presentation, a webinar, a social media video, etc.

In some examples, the gaze tracking module 218 is context-aware and has access to information that one or more video sources 106 in proximity are connected and are not user-facing video sources. In such examples, because the video sources 106 that are not user-facing, the gaze tracking module 218 may be configured to use gaze detection functions that detect user gaze direction and duration away from any of the user—facing video sources in proximity for which the video sourcing apparatus 104 has established data connectivity and towards a video source 106 such as a document camera that is not a user— facing video source.

As an example of a user-facing video source, a selected video source may be digital camera mounted at a top portion of a display and configured to have a field of view directed outwardly from a front plane of the display. As an example of a video source that is not user facing, a selected video source may be a digital camera such as a document camera that is adjustably mounted above a horizontal surface and configured to capture video data of a user manually interacting with a drawing surface.

In some examples, a particular video source such as a smart phone camera may be user facing or not user facing depending on the context. For example, a smart phone camera in a stand being used as a document camera may be determined to be not user— facing. However, in such cases, the gaze tracking module 218 may still be able to determine eye gaze towards a video source that is not user facing based on video data captured by other video sources that are user facing which indicate that the user is looking towards not user facing e.g., a document camera, a USB digital microscope, etc.

Alternatively, the video source video source activity module 216 may detect a change in activity level within the video source data such as video output from a document or smart phone functioning as a document camera. In some examples, changes in activity level 372 are detected by the motion detection module 222. If the video source type 322 is a window/screen share 336, a change in activity level may be on-screen video movement may be detected using screen or cursor movement detection functions that are independent of movement within the field of view of any cameras in proximity.

In certain examples, the gaze tracking module 218 limits a change of frequency in the field of view of the user. For example, in some examples, the gaze tracking module 218 implements filter or hysteresis algorithms that limit an update rate of gaze estimation in order to minimize distracting or unnecessary changes that may occur for example when a user is intelligently switching between a document camera and one or more user-facing cameras. Similar filter or hysteresis algorithms may be implemented for other modules such as the gesture recognition module 220 or the motion detection module 222.

In some examples, the video source activity module 216 uses the gesture recognition module 220 to detect video source activity 370 using parameters other than eye gaze 374. As depicted in FIG. 3, some such parameters may include gesture capture source status 376, gesture timing 378, and gesture type 380.

In certain examples, the gesture type 380 that may be detected may include head gestures, hand gestures, and combinations thereof. Some examples of head gestures may be a head nod 382 or a head lean 384. In certain examples, the gesture recognition module 220 may recognize a detected head gesture in a direction towards a particular video source 106n as an indication to select the particular video source 106n as the active video source.

In other examples, the gesture recognition module 220 may recognize a detected head gesture as a preparatory gesture indicating that a subsequent gesture or eye gaze is to be interpreted as an indication to select the particular video source 106n as the active video source. Alternatively, the head gesture may be configured as a confirmatory gesture indicating a command to the selection module 224 to select the active video source based on one or more parameters from the motion detection module 222, the gesture recognition module 220, or the gaze tracking module 218.

In various examples, the gesture recognition module 220 may recognize a detected hand gesture such as a finger count 386, a direction pointing 388, a virtual touch 390, a virtual swipe 392, and/or a user-defined gesture 394. A finger count 386 may indicate a preassigned number of a video source to select as the active video source 106. For example, if a digital single lens reflex camera is designated as video source number two, a gesture made by holding up a finger count of two fingers may be used to indicate selection of the single lens reflex camera as the active video source.

A gesture consisting of a direction pointing 388 may be made by pointing a finger or a hand in a particular direction a virtual swipe 392 in the particular direction indicating selection of the video source in proximity in the indicated direction, similar to a head lean 384 in a particular direction. A gesture made as a virtual touch 390 may be designated as a preparatory or confirmatory gesture similar to head nod 382.

The gesture capture source status 376 may be used to indicate whether a gesture that is recognized is detected in image data coming from a currently active, default, or "live" video source as opposed to a standby video source which is monitoring data but not outputting the data as the currently selected active/default video source. The gesture capture source status 376 enables a user to make a gesture in the field of view of a standby or candidate video source.

In various examples, the selection module 224 is configured to of multiple video sources in proximity in response to determining that the set of video's parameters for a selected source meets a predetermined set of active video source criteria for the current activity context 342. In certain examples, the current activity context 342 includes one or more application context 344 parameters selected from application type 346, application default video source 348, video event type 350, video attendees 352, and/or user-defined application context 354.

In some examples, the selection module 224 may further convey video control parameters to the information handling device 102 or to the video sources 106 such as commands to zoom, pan, tilt, turn on lighting, and so forth.

In certain examples, in response to the selection of a second video source as the active video source selection module is configured to cause the field of view of the second video source to be zoomed-in. Use of this feature in combination with the gesture capture source status may be utilized to allow a user to more conveniently make gestures that are detectable by video sources that are not currently selected as the active source, but that are not viewable within the zoomed-in video frame.

Figure 4A:
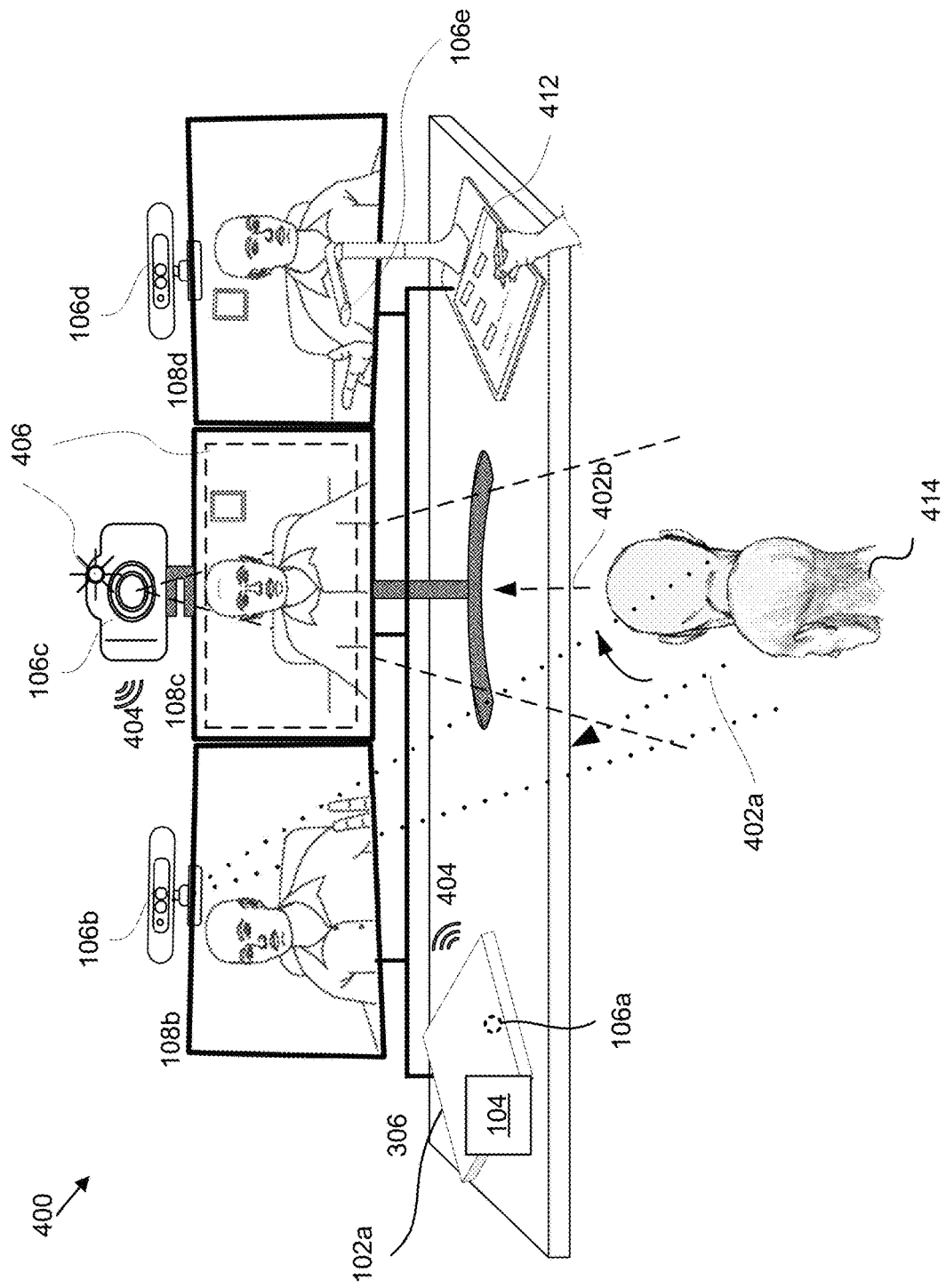
FIG. 4A is a perspective drawing depicting selected aspects of intelligent video source selection, according to one or more examples of the present disclosure.

FIG. 4A is a perspective drawing of an apparatus 400 illustrating selected aspects of intelligent video source selection, according to one or more examples of the present disclosure. It may be noted that with respect to the description of FIG. 4A and FIG. 4B, certain elements that are first depicted in FIGS. 1, 2, and/or 3 are referred to as may be recognized by the first digit of the reference numeral. In one depicted example, the apparatus 400 includes an instance of an information handling device 102a that is depicted as a laptop in docking mode with the lid closed and the video source 106a is turned off with the lid closed. The apparatus 400 also includes an instance of a video sourcing apparatus 104 which is depicted as being implemented, at least in part, using a processor and other components in or connected to the information handling device 102a.

The apparatus 400 depicts five video sources 106a, 106b, 106c, 106d, 106e. In one example, the video sourcing apparatus 104 determines that the two video sources 106b and 106d meet predetermined proximity criteria based on the video sources 106b and 106d having a wired connection 306 to the information handling device 102 (e.g., the docked laptop). The video sourcing apparatus 104 further determines that the video source 106c which is depicted as a Digital SLR camera with a wireless interface 404 meets a predetermined proximity criterion based on receiving an indication that the video source 106c is a Nearby Connection to (and is therefore within wireless range 308 of) the information handling device 102 (e.g., the docked laptop which also has a wireless interface 404).

The video sourcing apparatus 104 also determines that the video source 106e which is depicted as a document camera meets a predetermined proximity criterion based on receiving an indication that the video source 106e is a wire connection. Thus, all five of the video sources 106a, 106b, 106c, 106d, and 106e are physically close to the information processing device 102a but the integrated camera (e.g., of a laptop) does not meet predetermined proximity criteria and is excluded from selection as the active video source for the time being.

A user 414 is depicted as having shifted from a previous first gaze direction 402a (dotted line) to a current second gaze direction 402b (dashed line), so that the user's current direction is depicted in the images on the respective displays 108b, 108c, and 108d. Assuming for the example, that the context module 226 determined that the video event type 350 is an online class and that the user 414 is an instruct whose usage history indicates frequent usage of the video source 106e (e.g., the document camera) and assuming that the active video source criteria is based on gaze direction, in response to the shift to the current gaze direction 402b (e.g., towards the video source 106c (e.g., the DSLR camera) and thereby meeting the active video source criteria, the selection module 224 of the video sensing apparatus 104 selects the video source 106c (e.g., the DSLR) as the active video source. The selection module 224 may also cause an active video source indicator 406 to be displayed on the active video source (e.g., 106c) or a corresponding display 108c. Thus, certain basic operations of the video sourcing apparatus are illustrated. Several more complex operations are depicted in FIG. 4B.

Figure 4B:
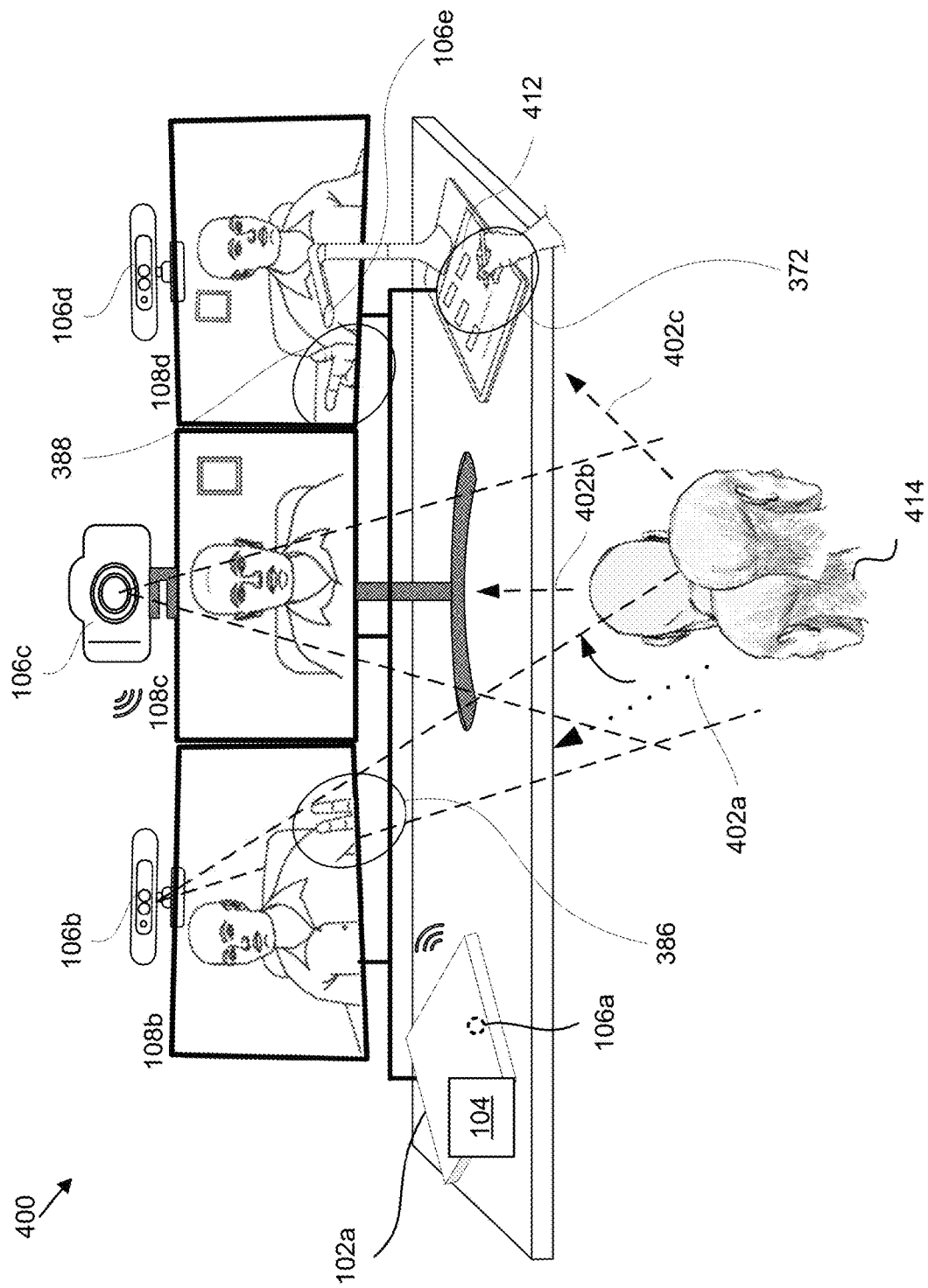
FIG. 4B is a perspective drawing depicting further aspects of intelligent video source selection, according to one or more examples of the present disclosure.

FIG. 4B is a perspective drawing depicting further aspects of intelligent video source selection, according to one or more examples of the present disclosure. The apparatus 400 depicted in FIG. 4B is substantially similar to the apparatus 400 described above with respect to FIG. 4B. The scenario or "use case" in FIG. 4B as well as the elements depicted are also similar except that in FIG. 4B, alternative video parameters 300 (as depicted in FIG. 3) that are compared with different predetermined active video source criteria 302 (also shown in FIG. 3) are depicted for a similar application context 344 (likewise depicted in FIG. 3).

For example, instead of the video sourcing apparatus 104 determining that the predetermined active video source criteria are met based on the shift in gaze direction from the first gaze direction 402a to the second gaze direction 402b, a user may perform a hand gesture such as the finger count 386 where the gesture of holding up two fingers indicates that the selection module 224 should select that video source 106 which is designated video source number two by the user.

In such a scenario, assume that the video source 106c is designated as video source number two. In response to capturing an image with the finger count 386 indicating the number two, the selection module 224 may select the video source 106c as the active video source. Additionally, as described above, in response to selecting the video source 106c as the active video source, the selection module 224 may communicate a command to zoom in to the video source 106c.

With the video source 106c zoomed in and serving as the active video source, assume that the user 414 next wants to use a video source that is not user-facing such as the video source 106e (e.g., a document camera or a smart phone camera on a stand) to manually interact with a drawing surface 112 (e.g., to show a hand drawn equation, drawing, or similar content).

Assume further that the user 414 now shifts to a third gaze direction 402c towards the video source 106e and away from video sources 106b and 106c. However, the third gaze direction 402c is also substantially towards video source 106d. Accordingly, the video source apparatus 104 may be configured to be context aware either using predetermined user video source preferences 362, user video source history, to select the video source 106e (e.g., the document camera) in response to the third gaze direction 402c whenever the video source 106e has been determined to be "in proximity."

In another example, instead of using only an eye gaze 374 e.g., the third gaze direction 402c, as an active video source criterion 302, the selection module 224 may include a change in activity level 372 or an average activity level that meets a predetermined threshold in the field of view of video source 106e as one of the active video source criteria either alone or in combination with the eye gaze 374 in the third gaze direction 402c. Alternatively, a gesture such as a direction point 388, pointing right with the right hand, noting that from the user's perspective the video source 106e, e.g., the document camera, is to the right of the other video sources (e.g., 106b, 106c). In some examples, an indication to select the next different video source in a particular may be repeated by repeating the gesture (e.g., direction point 388, virtual swipe 392) or by maintaining the gesture in the indicated direction for a predetermined period.

Figure 5:
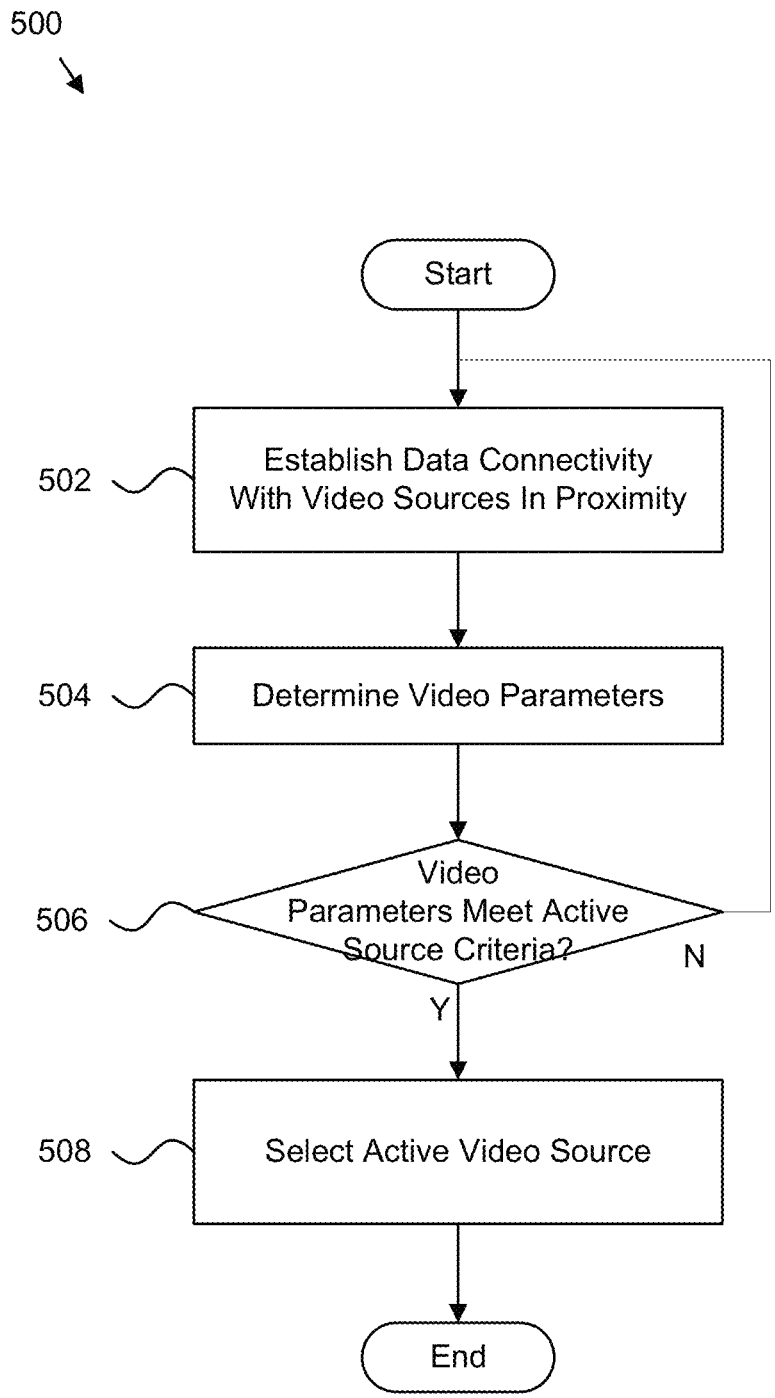
FIG. 5 is a schematic flow chart diagram illustrating a method for intelligent video source selection, according to one or more examples of the present disclosure.

FIG. 5 is a schematic flow chart diagram illustrating an example of a method 500 for intelligent video source selection according to one or more examples of the present disclosure. The method 500 includes establishing 502 data connectivity with a plurality of video sources based on the connecting video sources meeting one or more predetermined proximity criteria. The method 500 continues and includes determining 504 a set of video parameters corresponding respectively to individual video sources of the plurality of video sources for a current activity context. The method 500 continues and includes determining 506 whether the set of video parameters for the selected source meets a predetermined set of active video source criteria for the current activity context. The method 500 continues and include selecting 508 an active video source of the plurality of video sources in response to determining that the set of video parameters for the selected source meets a predetermined set of active video source criteria for the current activity context. In various examples, the method 500 may be implemented substantially as described above with respect to the functions of the system 100, and the apparatuses 200 and 400, using various video parameters 300 depicted respectively in FIGS. 1, 2, 4 and 3.

Figure 6:
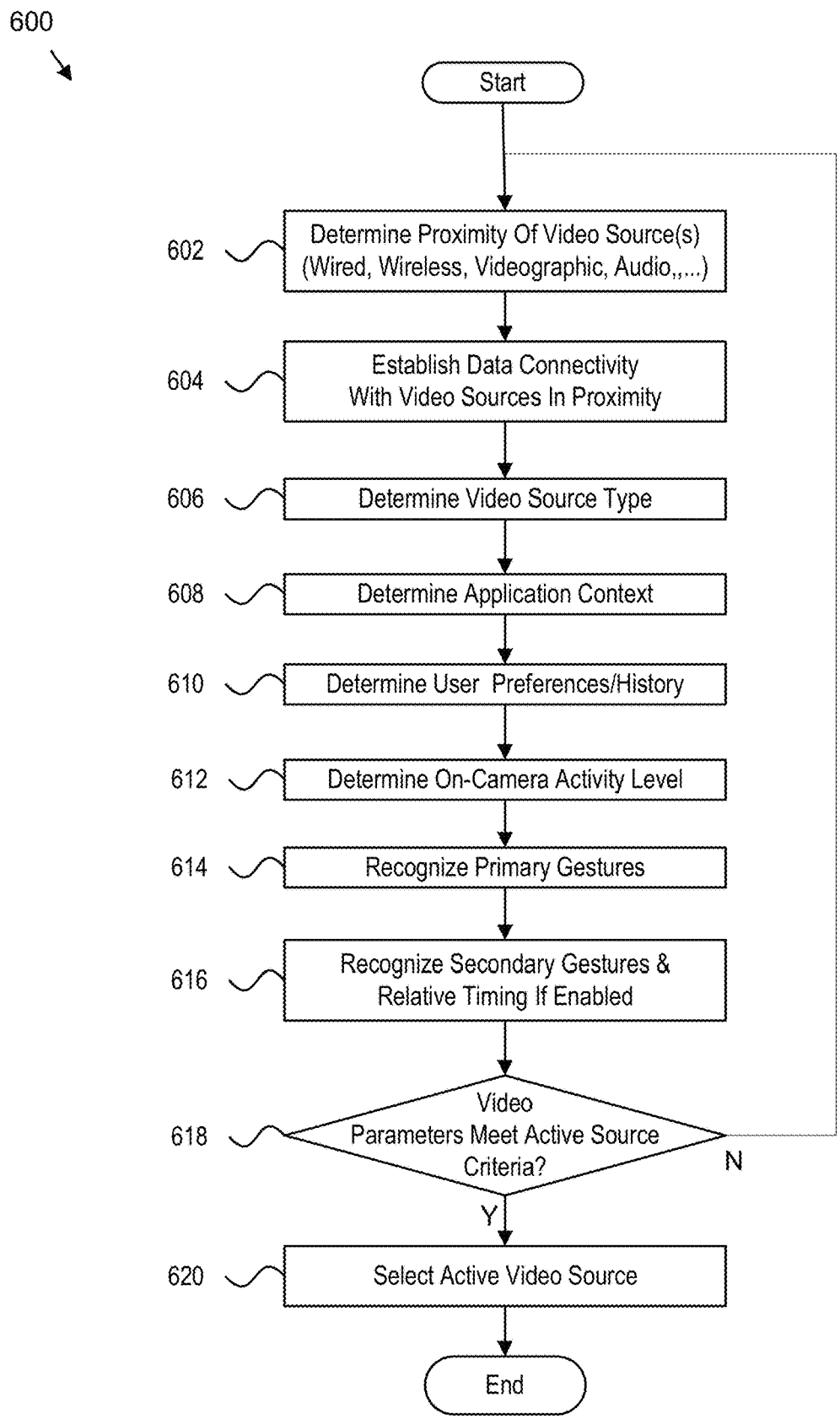
FIG. 6 is a schematic flow chart diagram illustrating another method for intelligent video source selection, according to one or more examples of the present disclosure.

FIG. 6 is a schematic flow chart diagram illustrating another method for intelligent video source selection, according to one or more examples of the present disclosure. The method 600 includes determining 602 a proximity of multiple video sources, such as video sources 106a . . . 106f depicted in FIG. 1. In one or more examples, determining the proximity may be performed by the video source proximity module 214.

In various examples, the method 600 continues and include establishing 604 data connectivity with a plurality of video sources based on the connecting video sources meeting one or more predetermined proximity criteria, such as for example, the video source proximity parameters 304 meeting one or more of the criteria A-H depicted in FIG. 3.

In one or more examples, the method 600 continues and may include determining 606 a video source type 322 such as those example types 324-338 as depicted in FIG. 3. The video source type may be utilized as one video parameter for determining whether to select an individual video source as a default video source or an active video source for a current activity context.

In certain examples, the method 600 continues and may include determining 608 an application context. In some examples, the application context is determined by an operating system and is accessed by the video sourcing apparatus 104 as one or more video parameters utilized in determining whether the set of video parameters for the selected source meets a predetermined set of active video source criteria for the current activity context.

In some examples, the method 600 continues and may include determining 610 one or more user video source preferences and/or user video source history, as illustrated, for example, in FIG. 3. As described above, the video source preferences and/or history may be input by the user, retrieved from a user profile, or inferred by machine learning analysis of user video source history performed locally to the information processing device or in one or more servers such as depicted in FIG. 1.

In various examples, the method 600 continues and may include determining 612 an "on-camera" activity level, e.g., for various video sources. For example, if a predetermined activity level is detected on-camera, meaning within an imaging field of view of a particular video source in proximity, that activity level may be one criterion in selection of the particular video source as an active video source. It may be noted that "on-camera" activity may be detected in images captured by video sources that are not the currently selected as the active video source.

In certain examples, the method 600 continues and may include recognizing 614 primary gestures. A primary gesture may be a gesture which is a sole gesture-based parameter for determining selection of an active video source or it may be a parameter that is used in combination with one or more preparatory gestures and/or confirmatory gestures as described above with respect to FIGS. 2, 3, and 4b.

In some examples, the method 600 continues and may include recognizing 616 secondary gestures, such as for example, one or more preparatory gestures and/or confirmatory gestures and the relative timing of such secondary gestures may be considered in determining whether or how to combine the secondary gestures with the primary gestures in performing intelligent video source selection.

In various examples, the method 600 continues and includes determining 618 whether the video source parameters determined meet one or more predetermined active video source criteria, such as described above with respect to FIGS. 2, 3, 4a, and/or 4b.

The method 600 continues and include selecting 620 an individual video source as an active and/or default video source in response to determining the individual video source meets the one or more predetermined active video source criteria.

In various examples, the method 600 may be implemented substantially as described above with respect to the functions of the system 100, and the apparatuses 200 and 400, using various video parameters 300, and/or the method 500 depicted respectively in FIGS. 1, 2, 4, 3, and 5.

In one or more examples, the method 500, the method 600, and/or the functions of the system 100, the apparatuses 200 and 400, may be implemented in a computer program product. For example, a computer program product, may include a machine-readable storage medium having program instructions embodied therewith, where the program instructions are executable by a processor to cause the processor to: establish data connectivity with a plurality of video sources based on the connecting video sources meeting one or more predetermined proximity criteria; compare values for a set of video parameters corresponding respectively to individual video sources of the plurality of video sources with a predetermined set of active video source criteria for a current activity context; and select an active video source of the plurality of video sources in response to determining that the set of video parameters for the selected source meets the predetermined set of active video source criteria for the current activity context.

Thus, the system 100, the apparatuses 200 and 400, and the methods 500 and 600, and a computer program such as described above may operate individually or collectively according to the various examples disclosed using various of the video parameters 300 herein to perform intelligent video source selection and may thereby improve the field of video capture and streaming over exiting platforms.

Examples may be practiced in other specific forms. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor to:
establish data connectivity with a plurality of video sources based on the connecting video sources meeting one or more predetermined proximity criteria;
determine values for a set of video parameters corresponding respectively to individual video sources of the plurality of video sources for comparison with a predetermined set of active video source criteria for a current activity context; and
select an active video source of the plurality of video sources in response to determining that the set of video parameters for the selected source meets the predetermined set of active video source criteria for the current activity context, wherein meeting the active video source criteria comprises detecting within a predetermined period:
a first type of video parameter comprising an eye gaze shift away from first video source towards a second video source; and
a second type of video parameter comprising a detected gesture mapped to an instruction to select the second video source as the active video source.

2. The apparatus of claim 1, wherein the processor is configured to determine the set of video parameters for the individual video sources within the current activity context, the set of video parameters comprising:
an eye gaze direction and duration towards the individual video sources that are operable to capture facial images;
a detected activity level within a video capture field of view of the individual video sources;
one or more detected gestures within a field of view of the individual video sources;
one or more user video source preferences for the current activity context that are retrieved from a user profile; and
one or more user video source preferences inferred by machine learning analysis of user video source history for the current activity context.

3. The apparatus of claim 1, wherein meeting the active video source criteria further comprises detecting that second lighting conditions detected by the second video source that are within a predetermined range of first lighting conditions of the first video source.

4. The apparatus of claim 1, wherein the detected gesture is selected from a head gesture, a hand gesture, and combinations thereof.

5. The apparatus of claim 4, wherein the hand gesture is selected from a finger count, a direction pointing, a virtual touch, a virtual swipe, a drawing movement, and combinations thereof.

6. The apparatus of claim 4, wherein the head gesture is selected from a head nod and a head lean.

7. The apparatus of claim 1, wherein prior to the selection of the second video source as the active video source, the detected gesture is within a current field of view of the second video source and outside a current field of view of the first video source.

8. The apparatus of claim 7, wherein in response to the selection of the second video source as the active video source the processor is configured to cause the field of view of the second video source to be zoomed in.

9. The apparatus of claim 1, wherein the current activity context comprises one or more application context parameters selected from application type, application default video source, video event type, video attendees, and/or user-defined application context.

10. The apparatus of claim 1, wherein the selected video source comprises a digital camera mounted at a top portion of a display and configured to have a field of view directed outwardly from a front plane of the display.

11. The apparatus of claim 1, wherein the selected video source comprises a digital camera adjustably mounted above a horizontal surface and configured to capture video data of a user manually interacting with a drawing surface.

12. A method, comprising:
establishing data connectivity with a plurality of video sources based on the connecting video sources meeting one or more predetermined proximity criteria;
determining a set of video parameters corresponding respectively to individual video sources of the plurality of video sources for a current activity context; and
selecting an active video source of the plurality of video sources in response to determining that the set of video parameters for the selected source meets a predetermined set of active video source criteria for the current activity context, wherein meeting the active video source criteria comprises detecting within a predetermined period:
  a first type of video parameter comprising an eye gaze shift away from first video source of the plurality of video sources towards a second video source of the plurality of video sources; and
  a second type of video parameter comprising a detected gesture mapped to an instruction to select the second video source as the active video source.

13. The method of claim 12, further comprising determining the set of video parameters for the individual video sources within the current activity context, the set of video parameters comprising:
an eye gaze direction and duration towards the individual video sources that are operable to capture facial images;
a detected activity level within a video capture field of view of the individual video sources;
one or more detected gestures within a field of view of the individual video sources;
one or more video source preferences for the current activity context that are retrieved from a user profile; and
one or more video source preferences inferred by machine learning analysis of user video source history for the current activity context.

14. The method of claim 12, wherein detecting the gesture comprises detecting one or more of:
a hand gesture selected from a finger count, a direction pointing, a virtual touch, a virtual swipe, a drawing movement, and combinations thereof; and
a head gesture selected from a head nod and a head lean.

15. The method of claim 12, wherein prior to the selection of the second video source as the active video source, the detected gesture is within a current field of view of the second video source and outside a current field of view of the first video source.

16. The method of claim 12, wherein meeting the active video source criteria further comprises detecting that second lighting conditions detected by a second video source of the plurality of video sources are within a predetermined range of first lighting conditions of a first video source of the plurality of video sources.

17. The method of claim 12, wherein the current activity context comprises one or more application context parameters selected from application type, application default video source, video event type, video attendees, and/or user-defined application context.

18. A computer program product, comprising a non-transitory machine-readable storage medium having program instructions embodied therewith, wherein the program instructions are executable by a processor to cause the processor to:
establish data connectivity with a plurality of video sources based on the connecting video sources meeting one or more predetermined proximity criteria;
compare values for a set of video parameters corresponding respectively to individual video sources of the plurality of video sources with a predetermined set of active video source criteria for a current activity context; and
select an active video source of the plurality of video sources in response to determining that the set of video parameters for the selected source meets the predetermined set of active video source criteria for the current activity context, wherein meeting the active video source criteria comprises detecting within a predetermined period:
  a first type of video parameter comprising an eye gaze shift away from first video source of the plurality of video sources towards a second video source of the plurality of video sources; and
  a second type of video parameter comprising a detected gesture mapped to an instruction to select the second video source as the active video source.

19. The computer program product of claim 18, wherein the detected gesture is selected from a head gesture, a hand gesture, and combinations thereof.

20. The computer program product of claim 19, wherein the hand gesture is selected from a finger count, a direction pointing, a virtual touch, a virtual swipe, a drawing movement, and combinations thereof.

* * * * *